US006965667B2

(12) United States Patent
Trabandt et al.

(10) Patent No.: US 6,965,667 B2
(45) Date of Patent: Nov. 15, 2005

(54) METHOD OF ACCOUNTING PREPAID ONLINE INTERNET SERVICE CREDIT VALUES

(75) Inventors: Jan Trabandt, Kirkland, WA (US); Daniel J. Gregory, Seattle, WA (US)

(73) Assignee: Slingshot Communications, Inc., Scottsdale, AZ (US)

( * ) Notice: Subject to any disclaimer, the term of this patent is extended or adjusted under 35 U.S.C. 154(b) by 0 days.

(21) Appl. No.: 10/158,276

(22) Filed: May 30, 2002

(65) Prior Publication Data

US 2003/0223558 A1 Dec. 4, 2003

(51) Int. Cl.$^7$ ............... H04M 15/00; H04M 17/00
(52) U.S. Cl. ............... 379/114.2; 379/114.15; 379/114.16; 379/114.17; 379/144
(58) Field of Search ............. 379/114.01, 114.15, 379/114.16, 114.17, 114.18, 114.2, 144; 705/52, 705/61, 76, 17, 39, 40

(56) References Cited

U.S. PATENT DOCUMENTS

| | | | | |
|---|---|---|---|---|
| 5,749,075 A | * | 5/1998 | Toader et al. ............ 705/14 |
| 5,828,737 A | * | 10/1998 | Sawyer ............... 379/114.07 |
| 6,000,608 A | * | 12/1999 | Dorf ..................... 235/380 |
| 6,009,156 A | * | 12/1999 | Cross .................. 379/114.26 |
| 6,243,450 B1 | * | 6/2001 | Jansen et al. ......... 379/144.01 |
| 6,320,947 B1 | * | 11/2001 | Joyce et al. ............ 379/114.2 |
| 6,333,976 B2 | * | 12/2001 | Lesley ................. 379/114.01 |
| 6,335,968 B1 | * | 1/2002 | Malik .................. 379/114.2 |
| 6,480,588 B1 | * | 11/2002 | Donovan ............... 379/114.2 |
| 6,507,644 B1 | * | 1/2003 | Henderson et al. ..... 379/114.2 |
| 6,529,593 B2 | * | 3/2003 | Nelson ................. 379/114.2 |
| 6,575,361 B1 | * | 6/2003 | Graves et al. ........... 235/380 |
| 6,581,827 B2 | * | 6/2003 | Welton ................ 235/380 |
| 6,690,779 B2 | * | 2/2004 | Walker et al. ........ 379/144.01 |

* cited by examiner

Primary Examiner—Quoc Tran
(74) Attorney, Agent, or Firm—Langlotz Patent Works, Inc.; Bennet K. Langlotz

(57) ABSTRACT

A method of accounting for online Internet usage credit includes establishing an account identifier in a database for a selected user. A number of credit value block records are associated in the database with the account identifier. Each credit value block has a stored credit value amount, and at least a second stored property indicator. In response to a measured amount of consumption of services by the user, at least one of the credit value blocks is debited by a debit amount based on the measured amount and the second stored property indicator. The stored property indicator may be a rate multiplier, or other factor indicating a different cost mode of online service, connection or usage.

10 Claims, 1 Drawing Sheet

US 6,965,667 B2

METHOD OF ACCOUNTING PREPAID ONLINE INTERNET SERVICE CREDIT VALUES

FIELD OF THE INVENTION

This invention relates to prepaid online Internet service, and more particularly to methods of accounting for users' account balance and usage activity.

BACKGROUND OF THE INVENTION

For some consumers, it is advantageous to purchase the right to connect to an Internet service provider in prepaid transactions, such as buying authorizing discs or cards at retail establishments, which contain authorization codes that enable access for a limited period of time. Consumers may also desire to purchase other prepaid services on the Internet. Such purchases enable Internet use by those consumers who prefer not to commit to an extended subscription, or lack the credit needed by most providers.

While effective, prepaid Internet systems have certain disadvantages. Each purchase normally has an assigned value of minutes of connect time. In existing prepaid Internet service systems, database records that define access codes for the system have a "number of local minutes" value and a "number of toll-free minutes" value. The toll-free value is hard-coded in the system to be calculated at a selected fraction (⅓, for example) of the local value, so that the available time for an access code would be used up 3 times faster when a user was connected to the provider's nationwide toll-free access line, to account for the added expense of the provider bearing the long distance charge.

However, the fixed ratio makes existing systems inflexible, since available minutes defined by all access codes in the system are calculated only at that ratio and cannot be calculated at any other ratio. This is disadvantageous, because it does not allow the provider to adjust the ratio to accommodate changing telecommunications costs and competitive market forces. Furthermore, pricing by the minute does not provide flexibility needed for other transactions having other cost structures, such as high-bandwidth video streaming. In addition, existing systems do not readily, or easily, allow a user to add credits to an existing account, but may require new accounts to be established for each block of connect time purchased.

The present invention overcomes the limitations of the prior art by providing a method of accounting for online Internet usage credit. The method includes establishing an account identifier in a database for a selected user. A number of credit value block records are associated in the database with the account identifier. Each credit value block has a stored credit value amount, and at least one second stored property indicator. In response to a measured amount of consumption of services by the user, at least one of the credit value blocks is debited by a debit amount based on the measured amount and the second stored property indicator. The stored property indicator may be a rate multiplier, or other factor indicating a different cost mode of online service connection or usage.

DETAILED DESCRIPTION OF A PREFERRED EMBODIMENT

Figure 1:
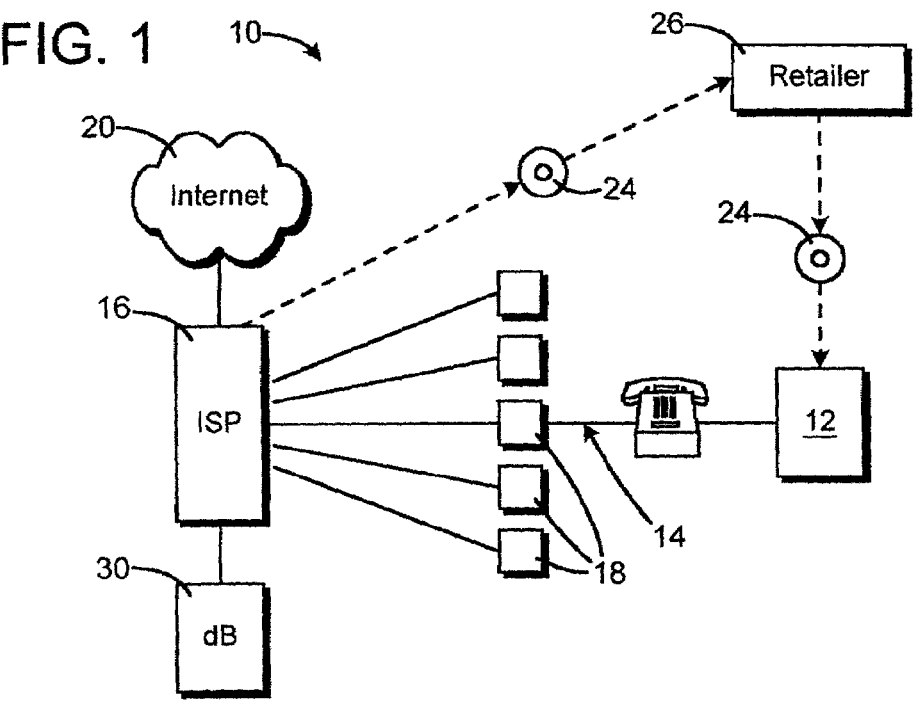
FIG. 1 is a schematic view of a system according to a preferred embodiment of the invention.

FIG. 1 shows an electronic communication system 10, operating in the environment of the Internet or other communication network. The diagram shows an Internet customer or user computer system 12. The Internet customer preferably uses one such Internet customer computer system to connect, via a telephone line 14, to an Internet service provider (ISP) computer system 16, to connect to the Internet. A bank of modems 18 or other suitable communication devices are connected to the ISP's computer system to receive calls from users to provide computer connections. While communication connections are shown directly between entities for clarity, the actual communications may be routed through the Internet, or various other shared or private communications networks or connections.

Although discussed in terms of the Internet, this disclosure and the claims that follow use the term "Internet" to include not just personal computers, but all other electronic devices having the capability to interface with the Internet or other computer networks, including portable computers, telephones, televisions, appliances, electronic kiosks, and personal data assistants, whether connected by telephone, cable, optical means, or other wired or wireless modes including but not limited to cellular, satellite, and other long and short range modes for communication over long distances or within limited areas and facilities. When entities are described as being connected to the Internet, it is understood that the company maintains computer servers and other suitable equipment for communicating with other entities via the Internet.

The ISP 16 produces authorization tokens such as cards and computer discs 24 that are manufactured and physically delivered to a retailer 26 for purchase by the user. The value amount of the token may be established at time of manufacture (such as a card imprinted for 10 hours of connect time) or at time of purchase (such as a given card being credited with any selected time amount, and that information being transmitted by the retailer back to the ISP.) A disc includes an authorization or access code that the user enters at the outset of a communication session with the ISP, so that the ISP can search a database 30 to authenticate the code, and to associate the user's computer identifier or cookie with the code. This ensures that no other user may steal or guess the code to connect from another computer and deplete the purchased credits. In alternative embodiments, the authorization code may be delivered by any alternative means, including electronic transmission via the Internet or other modes.

The method of the preferred embodiment of the invention proceeds with respect to several definitions, which follow:

The ISP, or Internet Service Provider is generally a company which provides access to the world-wide network of computers known as the Internet via some type of a physical connection (e.g. a standard phone line, DSL line, cable modem, mobile wireless, etc.) over which the standard Internet communication protocols are transmitted. Software on the end user's computer initiates the connection to the ISP's datacenter, and if the user supplies a valid set of security credentials (username and password, generally), they are granted access to the datacenter and thus to the Internet. The majority of ISPs in the US are subscription-based, they sell unlimited Internet access time for a fixed rate per month.

Prepaid Internet Access is a means of providing ISP services. The prepaid ISP sells access codes that define discrete amounts of network access time (e.g. 10 hours, 20 hours, etc.) and can be delivered to the end customer via several methods. Generally, the code is printed on a credit card-sized card that is sold at retail outlets, typically in conjunction with a CD containing a simple client dialer interface (see dialer client below). In the preferred embodiment, the client and a limited free trial access code are also available via download from the ISP's website.

A Primary Access Code (PAC) in the preferred embodiment system is a numeric, alphabetic, symbolic or alphanumeric code that is the first access code that a given user uses to access the system. The PAC both identifies the amount of prepaid Internet access time a user has purchased and functions as the username for logging into the system. In the preferred embodiment, it is used for system access in combination with a password that is auto-generated upon the user's first connection to the system, which we call the registration of the PAC (see Registration below).

A dialer client is a software program in the ISP's system that provides a user friendly interface for connecting to the ISP's prepaid Internet backend platform.

Registration is the automated system process within the ISP's system by which an access code is taken from the pool of available, unused access codes and placed in the set of PACs that are in use. The PAC then becomes the customer's username in the ISP's system, and a randomly generated password is assigned, which is then passed back to the client to be stored on the user's computer. Thus, the registration process entails a state change for the access code, as well as creating an authentication mechanism for granting access to the ISP's network Stored Value System is a more generic phrase for "prepaid system." The value purchased by a customer is stored in a system which allows the customer to remove value when needed and also to add value when desired.

The RADIUS protocol, Remote Authentication Dial-In User Service, is an industry standard authentication protocol for granting a client computer access to a computer network over a dial-up connection by providing credentials to the network servers that include a username and password. This protocol is defined in Internet RFCs 2865, 2866 and their associated RFCs.

A NAS is a Network Access Server, a specialized server that is connected to a bank of modems (or virtual modems). The NAS allows, denies, or limits access to a computer network for individual computers that dial in to its modem bank. ISPs typically have many NASes, corresponding to the geographical areas in which the ISP provides service. Informational Internet RFCs 2881, 2882, and 3169 provide more info on NAS protocols and functionality.

The preferred embodiment of the invention treats each access code that is defined in the ISP system as an individual block of value that has any number of usage modifiers attached to it. Those usage modifiers determine how much a specific value block is worth in terms of remaining value units (not necessarily minutes of connect time) depending on the method the consumer uses to access the value it defines. Any number of these value blocks may be associated with each other via a common identifier. In the preferred embodiment, the identifier is an account number, the user's primary activation code or PAC, which is used to associate all related value blocks with their user. In the alternative, the ISP may assign a numeric identifier to each PAC, which may facilitate indexing and processing. This PAC is normally assigned in conjunction with the user's first transaction, so that subsequent value recharges (addition of new value blocks) are associated with the same account. The aggregate value of the group of value blocks associated with that common identifier/user can be presented to the user upon system access. This allows each value block to have different numeric values for the usage modifiers for the same usage type/method of access. As will be discussed below, these numeric values may apply to a variety of parameters, including toll-free multipliers, expiration dates, rounding factors. etc. Other values may apply to credited services other than time consumed, such as files downloaded, music clips and video movies played or downloaded. Essentially each block of credit purchased may have an associated database record that contains a wide range of useful information that determines how it is used, debited, and communicated to the user. Alternative storage methods to conventional database records such as hierarchical files may also be used.

For example, for two associated value blocks purchased by a single user in different transactions, one value block may have a usage modifier called "toll-free rate" that is 5, with a total block value of 600, and another block may have a "toll-free rate" of 3 with a total block value of 300. The aggregate "toll-free rate" value that can be communicated to the user upon system access via the toll-free phone number is (600/5)+(300/3)=120+100=220. The same two blocks could have another usage modifier called "local rate", both equal to 1. Accessing the account via a local phone number results in an aggregate value of (600/1)+(300/1)=900. In the preferred embodiment system, these would literally translate into 220 minutes of access time using the toll-free access number or 900 minutes on a local access number.

Note that this method allows the aggregate value of any number of associated value blocks to be accessed and used without requiring the user to know the details about the individual blocks of value—the user is normally only aware of the aggregate value and how much aggregate value has been used or remains in the "account". The system automatically tracks the total amount of value accessed at any one time and removes it from the value blocks associated with the user, applying to each block the correct usage modifier based on the usage type until the total value used is accounted for. Typically, all of the value in one value block is depleted before moving on to the next value block in the associated set. This means that at the beginning of the transaction, the system must either calculate the total aggregate value immediately or already have calculated it after the previous transaction, as in the preferred embodiment. The user can add value blocks to the "account" at any time and the system automatically adds the new block's value into the aggregate.

The preferred embodiment includes a method for specifying, within a data record (a PAC or recharge/added value block) in a computer system, any number of value-modifying factors to be applied to a single, modifiable numeric value (the remaining total available credit/units) which represents value within the system that belongs to an user. The method guarantees that the modifying factors defined when the data record is created (the value block is added to the system and available for purchase) are the same modifying factors applied when value is removed and credits consumed from the modifiable numeric value due to a system transaction on behalf of the value user. Aggregation of the records belonging to user is accomplished by assigning a single, unique identification code (the PAC) to all data records in the system that belong to that user.

The user's access to the total value defined by the aggregated data records is unrestricted, meaning that any value up to, but not exceeding, the aggregate total at each value factor can be accessed/used at any one time. The system automatically accounts for value usage, and applies the correct value-modifying factor for the usage type for each data record as value is removed from each record's modifiable numeric value.

The preferred embodiment employs the concept of an account by maintaining an identifier (the PAC) for each user who has activated a PAC on the system. This identifier is used to associate any number of stored value blocks (including the original PAC block) by adding the identifier to a newly created value block or to an existing, inactive block at the time it is activated or used for recharging an account. Each block has an intrinsic base value which is subtracted from in accordance with the value-modifying factors associated with each stored value block, and depending on the method which the user employs to access the stored value account. One important advantage of the preferred embodiment is that each block of stored value is consumed/modified according to the rate factors defined for/applied to that block when it was created in the system. In other words, the rate factors are not applied in a blanket fashion to the account itself, but rather to the base value of each block of stored value in the account. This enables the storage of value blocks with both various base values as well as various rate factors in a single account.

Figure 2:
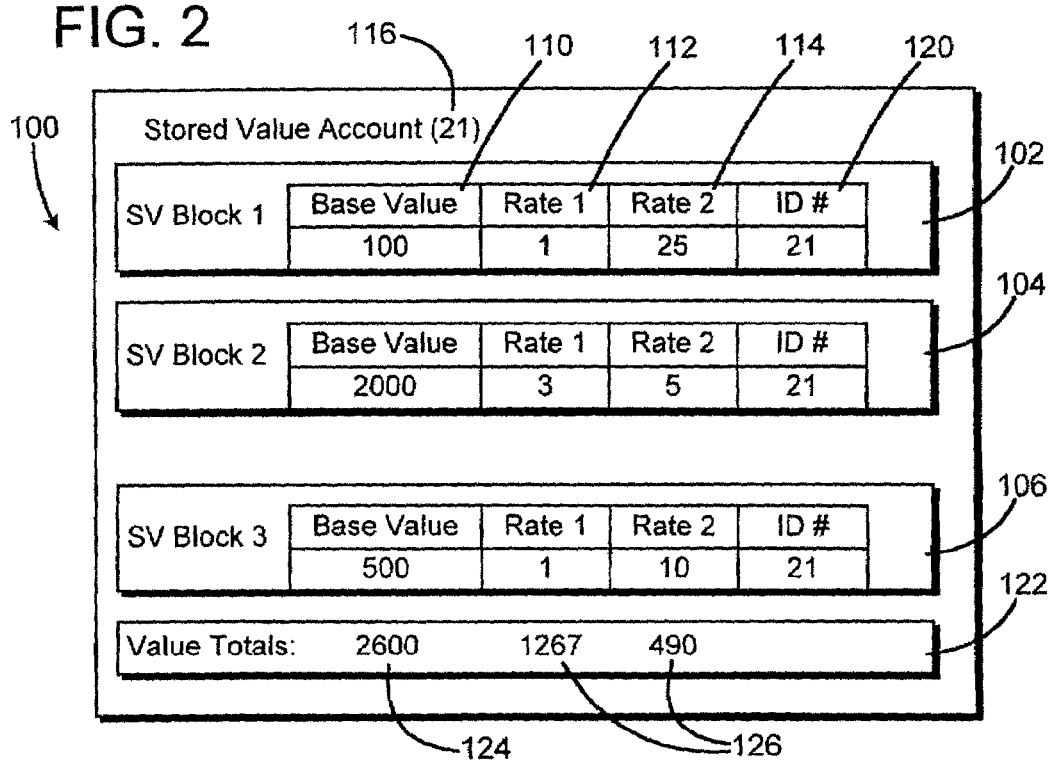
FIG. 2 is a tabular representation of a database element according to a preferred embodiment method of the invention.

FIG. 2 illustrates the concept of applying a number of variable rates to blocks of stored value with differing base values in a stored value account. This is a simplified embodiment for clarity of illustration. In a preferred embodiment, other data fields and data records would be employed to track how much total value is left in the account, how much value has been used from the account, the original value of each value block, and how much value has been used for each stored value block, as well as when it was used, how it was used and which rate was applied during a specific instance of usage. A user's account information is stored as a database record 100 and includes a first data block 102 corresponding to the initial purchase of credit. Unlimited subsequent blocks 104, 106 are added as additional blocks of credit are purchased by the user to "recharge" the account. Each block includes a base value 110 that indicates the number of units credited, a first rate value 112 that indicates a multiplier for local access and a second rate indicator 114 that indicates a multiplier for toll-free access. Unlimited additional rate indicators may be provided for other usages such as video streaming and MP3 downloads. When reference is used to a rate multiplier, it is intended to encompass any usage factor, whether divided into the usage amount, or with any other numeric calculation based on the factor.

The preferred embodiment employs a method of calculating value usage, and must properly remove aggregate value from an associated record set (account) when a transaction of a specific usage type is processed by the system. Value must be removed from the records or blocks individually. Consequently, because the transaction value may be between zero and the total aggregate value for the usage type, the algorithm must remove value from successive data blocks at the correct usage rate for that data block until the total value of the transaction has been removed from the associated record set. In some instances, the transaction's total value can be removed from a single stored value record in the set. In others, it may require processing more than one record.

The preferred embodiment method employed for value debiting employs the following steps:
1. Find all value blocks associated by the common identifier for the user. The value blocks may be ordered in some way, such as by an expiration date or usage order priority value or other properties in the value block.
2. Using the total unadulterated transaction value, RtransTotal, start with the first value block.
3. With the current value block, calculate its rate-adjusted value, RblockValue, as RblockValue= this block's Base Value/this block's UsageRate, where UsageRate is the appropriate rate for the transaction based on the method of access.
4. If RblockValue−RtransTotal>=0, then set the current block's Base Value to Base Value−(RtransTotal×UsageRate) and stop processing for this transaction since the transaction's total value has been accounted for. (Multiplying RtransTotal by the usage rate converts the transaction value back to the same value type that the Base Value is expressed in).
5. (Otherwise) set RtransTotal=RtransTotal−RblockValue and set the Base Value for the current value block to zero.
6. Move to the next value block in the associated record set and loop back to step 3.

In a pseudo-coding style, the method is represented as:
1. Find all value blocks in the database for the common identifier (PAC) associated with the transaction,
2. RtransTotal=total unadulterated transaction value, and ThisBlock=first value block in the associated set (to loop through).
3. UsageRate=ThisBlock.RateN (the appropriate usage rate) RblockValue=(ThisBlock.BaseValue)/(UsageRate)
4. If RblockValue−RtransTotal>=0, then (ThisBlock.BaseValue)=(ThisBlock.BaseValue)−(RtransTotal×UsageRate) and exit loop (all transaction value accounted for).
5. (Otherwise)
   RtransTotal=RtransTotal−RblockValue
   ThisBlock.BaseValue=0
6. ThisBlock=next associated value block and loop to step (3).

After processing a transaction, the system can also recalculate and store the remaining aggregate value in the account for all rate types so that the system will easily be able to tell whether a transaction of at one of the usage rates is allowable (i.e. there is enough value in the account) upon initiation of the next transaction at any one of the defined rates.

FIG. 2 illustrates an example. The user identifier or PAC is identified at element 116, and this identifier is indicated in column 120 with the same identifier entered in each block, to associate that credit block with the user. An aggregate value display block 122 contains data to be made available to the user, with a total 124 of all remaining unit credits, and calculated time limits remaining 126 for each of the different modes of use.

In the illustrated example, three data records in a stored value system are associated by the identifier 21. The Base Values and UsageRates for each and the total aggregate value at each UsageRate are shown in the diagram below. The user who owns these stored value blocks (ID#21) initiates a transaction for 400 units of value at Rate 2. The system has previously stored that the aggregate value for ID #21 at Rate 2 is 490, so it is able to process the transaction. The algorithm processes the transaction in this way:

First, all value blocks with ID #21 are selected from the set of all active value blocks in the system. Then,
RtransTotal=400 (unadulterated)
ThisBlock=SV Block #1 for ID 21,
ThisBlock.RblockValue=100/2.5=40

ThisBlock.RblockValue−RtransTotal<0 (40−400=−360), so ThisBlock.BaseValue=0 and RtransTotal=400−40=360.

[This is where the code loops]

ThisBlock=SV Block #2,

ThisBlock.RblockValue=2000/5=400, and

ThisBlock.RblockValue−RtransTotal>=0 (400−360=40), so ThisBlock.BaseValue=2000−(360×5)=200, and processing for this transaction is finished since all of RtransTotal has been accounted for.

Value totals can then be recalculated and stored so the system is ready for the next transaction and the user's account now has a base value of zero for block one, and a base value of 200 for block 2. The unit total remaining is 700, which corresponds to 567 minutes at rate 1, or 90 minutes at rate 2. Consequently, when the next transaction for this customer is initiated, the system knows whether there is enough aggregate value in the customer's account to process the transaction before doing the actual processing.

While the above is discussed in terms of preferred and alternative embodiments, the invention is not intended to be so limited. For instance, the embodiment above has been simplified for clarity, omitting the following considerations that relate to time-based transactions:

Rounding up of the transaction value to the appropriate rounding factor (for example, to the nearest minute or nearest multiple of 10) when debiting from the last value block, which may even require debiting from yet another value block in certain circumstances.

Keeping track of transaction value vs. value block's value being debited since they don't always match perfectly (e.g. seconds of Internet usage vs. value blocks' units) on a value block by value block basis. For example, if it is needed to debit a transaction value of 20, and the first value block has a Base Value of 92 and a rate of 5 (RblockValue=Base Value/rate=92/5=18 (technically 18.4)), then one may debit all 92 base value units which should be 18.4 units (92/5=18.4), but one then needs to debit only 1.6 units from the next value block instead of the 2 that would be calculated from the formula RtransTotal−RblockValue=20−18=2.

What is claimed is:

1. A method of accounting for online Internet usage credit comprising:
    establishing an account identifier in a database for a selected user;
    associating a first credit value block record in a database with the account identifier in response to a first purchase transaction by a user;
    in response to a second purchase transaction by a user, associating a second credit value block record in a database with the account identifier;
    generating an aggregate value total for the first and second value block; and
    wherein at least one of the credit value blocks is associated with a stored property indicator selected from a group comprising rate multipliers, bandwidth factors, toll-free usage indicators, expiration dates, priorities, rounding factors and purchase dates.

2. The method of claim 1 including the user consuming online services after associating the first record, and before associating the second block record.

3. The method of claim 1 including transmitting to the user the aggregate value total.

4. The method of claim 1 including providing a first and second rate value for each block, and generating a time-remaining value for each of the rates based on the units remaining for each block and the rate values for each block.

5. The method of claim 1 including providing a rate multiplier for each block, such that consumption of online service time is limited based on a function of the credit value and rate multiplier.

6. The method of claim 5 wherein the blocks have different rate multipliers.

7. The method of claim 5 including, in response to a measured amount of consumption of services by the user, debiting at least one of the credit value blocks by a debit amount based on the measured amount and the rate multiplier.

8. The method of claim 5 including fully depleting a first credit value block if the debit amount exceeds the stored credit value amount of the first credit value block, and debiting a second credit value block by the difference between the stored credit value amount of the first credit value block and the debit amount.

9. The method of claim 1 wherein the second stored property indicator for a credit value block is established at a time of purchase by the user, and including depleting the credit value block at a selected rate associated with the second stored property indicator.

10. A method of accounting for online Internet usage credit comprising:
    establishing an account identifier in a database for a selected user;
    associating a plurality of credit value block records in the database with the account identifier;
    each credit value block having a stored credit value amount, and having at least a second stored property indicator selected from a group comprising rate multipliers, bandwidth factors, toll-free usage indicators, expiration dates, priorities, rounding factors and purchase dates; and
    in response to a measured amount of consumption of services by the user, debiting at least one of the credit value blocks by a debit amount based on the measured amount second stored property indicator.

* * * * *